United States Patent
McPherson et al.

(10) Patent No.: US 11,659,852 B2
(45) Date of Patent: *May 30, 2023

(54) PELLETIZED COLORANTS COMPRISING A PIGMENT-PROTEIN COMPLEX AND FOOD PRODUCTS INCLUDING THE SAME

(71) Applicant: Kraft Foods Group Brands LLC, Chicago, IL (US)

(72) Inventors: Andrew E. McPherson, Mount Prospect, IL (US); John Topinka, Evanston, IL (US); Sara K. Cooper, Charleston, SC (US)

(73) Assignee: Kraft Foods Group Brands LLC, Chicago, IL (US)

(*) Notice: Subject to any disclaimer, the term of this patent is extended or adjusted under 35 U.S.C. 154(b) by 209 days.

This patent is subject to a terminal disclaimer.

(21) Appl. No.: 17/125,628

(22) Filed: Dec. 17, 2020

(65) Prior Publication Data

US 2021/0100269 A1 Apr. 8, 2021

Related U.S. Application Data

(63) Continuation of application No. 16/080,413, filed as application No. PCT/US2017/016409 on Feb. 3, 2017, now Pat. No. 10,905,142.

(60) Provisional application No. 62/301,710, filed on Mar. 1, 2016.

(51) Int. Cl.
| | |
|---|---|
| A23L 5/43 | (2016.01) |
| A23P 10/30 | (2016.01) |
| A23L 29/281 | (2016.01) |
| A23L 5/42 | (2016.01) |
| A23L 5/40 | (2016.01) |
| A23L 29/256 | (2016.01) |
| A23L 29/30 | (2016.01) |

(52) U.S. Cl.
CPC .............. *A23L 5/43* (2016.08); *A23L 5/40* (2016.08); *A23L 5/42* (2016.08); *A23L 29/256* (2016.08); *A23L 29/284* (2016.08); *A23L 29/30* (2016.08); *A23L 29/35* (2016.08); *A23P 10/30* (2016.08); *A23V 2002/00* (2013.01)

(58) Field of Classification Search
CPC ............ A23L 5/43; A23L 5/42; A23L 29/30; A23L 29/35; A23L 5/40; A23L 29/256; A23L 29/284; A23P 10/30

See application file for complete search history.

(56) References Cited

U.S. PATENT DOCUMENTS

| | | |
|---|---|---|
| 4,409,254 A | 10/1983 | Garin |
| 4,615,898 A | 10/1986 | Brown |
| 4,725,441 A | 2/1988 | Porter |
| 10,905,142 B2 | 2/2021 | McPherson |
| 2004/0202755 A1 | 10/2004 | Myers |
| 2008/0124391 A1 | 5/2008 | Evans |
| 2008/0145493 A1 | 6/2008 | Myers |
| 2011/0052680 A1 | 3/2011 | Hendrickson |
| 2011/0062630 A1 | 3/2011 | Honda |
| 2013/0216665 A1 | 8/2013 | Mason |
| 2013/0243870 A1 | 9/2013 | Abe |
| 2013/0281548 A1 | 10/2013 | Jin |
| 2014/0364512 A9 | 12/2014 | Jin |

FOREIGN PATENT DOCUMENTS

| | | |
|---|---|---|
| CN | 102356834 | 2/2012 |
| CN | 102640933 | 8/2012 |
| CN | 103070847 | 5/2013 |
| CN | 103330696 | 10/2013 |
| CN | 104320979 | 1/2015 |
| CN | 105192839 | 12/2015 |
| DE | 3501305 | 7/1986 |
| EP | 0693535 | 1/1996 |
| EP | 2484230 | 8/2012 |
| EP | 3460006 | 3/2019 |
| JP | S5476867 | 6/1979 |
| JP | S6125450 | 2/1986 |
| JP | S61146173 | 7/1986 |
| JP | S61254155 | 11/1986 |
| JP | S63254968 | 10/1988 |
| JP | 2005295829 | 10/2005 |
| JP | 2011142834 | 7/2011 |

(Continued)

OTHER PUBLICATIONS

Chinese Patent Application No. 201780014613.2, First Office Action and Search Report, dated Jul. 5, 2021, 28 pages (with English translation).

Lv, Xiao-ling, et al., "Preparation of Phycocyanin Microcapsules by the Air Suspension." Food Science and Technology, Feb. 20, 2013, pp. 260-263 (English abstract available only).

Martelli, Giulia, et al., "Thermal Stability Improvement of Blue Colorant C-Phycocyanin from Spirulina platensis for Food Industry Applications." Process Biochemistry, vol. 49, issue 1, Jan. 2014, pp. 154-159 (English abstract available only).

Munier, Mathilde, et al., "Physicochemical Factors Affecting the Stability of Two Pigments: R-phycoerythrin of Grateloupia turuturu and B-phycoerythrin of Porphyridium cruentum." Food Chemistry, vol. 15, May 1, 2014, pp. 400-407 (English abstract available only).

(Continued)

*Primary Examiner* — Katherine D Leblanc
(74) *Attorney, Agent, or Firm* — Fitch Even Tabin & Flannery LLP

(57) ABSTRACT

According to embodiments, a dry powdered composition which may be reconstituted to provide a gelatin product includes powdered gelatin and a pelletized colorant. The pelletized colorant includes a pigment-protein complex and at least one encapsulating agent for encapsulating the pigment-protein complex. The pelletized colorant has a rate of dissolution a rate of dissolution of less than 2 grams/minute in water having an initial temperature of from about 95° C. to about 100° C. Methods of making food products with the pelletized colorant are also disclosed. In embodiments, when the food products are measured on the L*a*b* color space, the food products have an L* value of about 49 to about 57, an a* value of about −10 to about −16, and a b* value of from about −11 to about −20.5.

20 Claims, No Drawings

(56) References Cited

FOREIGN PATENT DOCUMENTS

| | | |
|---|---|---|
| SU | 946453 | 7/1982 |
| SU | 1748786 | 7/1992 |
| UZ | 2338 | 8/2003 |
| WO | 1992001754 | 2/1992 |
| WO | 2008116391 | 10/2008 |
| WO | 2012059590 | 5/2012 |
| WO | 2015048348 | 4/2015 |

OTHER PUBLICATIONS

Xu, et al., "Study on Purification and Stability of Phycocyanin in Spirulina." Jul. 15, 2014, 8 pages (No English abstract available).
European Patent Application No. 17706608.1, Office Action dated Sep. 30, 2020, 7 pages.
International Search Report and Written Opinion dated Apr. 25, 2017, pertaining to International Patent Application No. PCT/US2017/016409, 12 pages.
Russian Patent Application No. 2018132654, Office Action dated Apr. 9, 2020, 11 pages (with English translation).
Fan Qingsheng et al., "Health Food Technology," Beijing: China Medical Science and Technology Press, Nov. 2006, pp. 161-162.

PELLETIZED COLORANTS COMPRISING A PIGMENT-PROTEIN COMPLEX AND FOOD PRODUCTS INCLUDING THE SAME

CROSS-REFERENCE TO RELATED APPLICATIONS

This application is a continuation of U.S. application Ser. No. 16/080,413, filed Aug. 28, 2018, which is a national phase of International Application No. PCT/US2017/016409, filed Feb. 3, 2017, which claims the benefit of U.S. Provisional Application No. 62/301,710, filed Mar. 1, 2016, which are incorporated herein by reference in their entireties.

TECHNICAL FIELD

The present specification generally relates to delivery systems for natural colorants and, more specifically, to pelletized colorants comprising a pigment-protein complex and gelatin compositions comprising the same.

BACKGROUND ART

Typically, gelatin includes synthetic colorants and/or dyes to give the gelatin a rich color that may be representative of the flavor of the gelatin mixture. However, consumers now desire that products have more natural ingredients and include fewer synthetic colorants, flavors, and preservatives. Although natural colorants are known, they can limit the colors available for production. For example, there are a limited number of natural colorants from which the color blue may be derived.

In addition, these natural colorants may be susceptible to degradation during processing, either during manufacture or during product preparation. For example, some natural colorants may degrade upon exposure to elevated temperatures, which degradation may change the color of the colorants.

Accordingly, a need exists for systems and methods for stabilizing natural colorants.

SUMMARY OF INVENTION

According to one embodiment, a colorant for a food product may include from about 0.1 wt % to about 40 wt % pigment-protein complex. The colorant may further include from about 60 wt % to about 99.9 wt % encapsulating agent. The encapsulating agent encapsulates the pigment-protein complex in a pelletized colorant that may have a rate of dissolution of less than about 2 grams/minute in water having an initial temperature of from about 95° C. to about 100° C.

According to another embodiment, a dry powdered composition which may be reconstituted to provide a gelatin product includes powdered gelatin; and a pelletized colorant. The pelletized colorant includes a pigment-protein complex and at least one encapsulating agent for encapsulating the pigment-protein complex. The pelletized colorant has a rate of dissolution of less than 2 grams/minute in water having an initial temperature of from about 95° C. to about 100° C.

According to another embodiment, a method of making a powdered gelatin composition includes mixing powdered gelatin with a pelletized colorant. The pelletized colorant includes from about 0.1 wt % to about 40 wt % pigment-protein complex based on the pelletized colorant and from about 60 wt % to about 99.9 wt % encapsulating agent based on the pelletized colorant. The pelletized colorant has a rate of dissolution of less than 2 grams/minute in water having an initial temperature of from about 95° C. to about 100° C.

According to another embodiment, gelatin is made from a powdered gelatin composition. The powdered gelatin composition includes powdered gelatin; and a pelletized colorant. The pelletized colorant includes a pigment-protein complex and at least one encapsulating agent for encapsulating the pigment-protein complex. When the gelatin is measured on the L*a*b* color space, the gelatin has a L* value of about 49 to about 57, an a* value of about −10 to about −16, and a b* value of from about −11 to about −20.5.

Additional features and advantages will be set forth in the detailed description which follows, and in part will be readily apparent to those skilled in the art from that description or recognized by practicing the embodiments described herein, including the detailed description which follows and the claims.

It is to be understood that both the foregoing general description and the following detailed description describe various aspects and embodiments and are intended to provide an overview or framework for understanding the nature and character of the claimed subject matter.

DESCRIPTION OF EMBODIMENTS

Reference will now be made in detail to various embodiments of pelletized colorants comprising a pigment-protein complex and food products comprising the same. The pelletized colorant utilizes an encapsulating agent to encapsulate a pigment-protein complex and control the rate of dissolution of the pigment-protein complex. Accordingly, when the powdered gelatin is mixed with boiling water to form a food product such as gelatin, the pigment-protein complex is protected from the boiling water and the resultant color of the food product is desirable. In one embodiment, the pelletized colorant includes from about 0.1 wt % to about 40 wt % of a pigment-protein complex based on the pelletized colorant and from about 60 wt % to about 99.9 wt % encapsulating agent based on the pelletized colorant. In another embodiment, when the food product formed with the pelletized colorant is measured on the L*a*b* color space, the food product has an L* value of about 49 to about 57, an a* value of about −10 to about −16, and a b* value of from about −11 to about −20.5. Various embodiments of pelletized colorants comprising a pigment-protein complex and food products formed therefrom will be described in further detail herein.

As used herein, a "wt %," "weight percent" or "percent by weight," unless specifically stated to the contrary, is based on the total weight of the total dry powdered composition.

Specific and preferred values disclosed for components, ingredients, additives, temperatures, times, and like aspects, and ranges thereof, are for illustration only. They do not exclude other defined values or other values within defined ranges. The compositions, apparatuses, and methods of the disclosure include those having any value or combination of the values, specific values, or ranges thereof described herein.

One class of natural colorants is pigment-protein complexes such as, for example and without limitation, phycocianins. These pigment-protein complexes can be used as a colorant in food products. However, it has been found that under certain conditions, the color of the pigment-protein complex can change or degrade, producing an undesirable color. For example, it has been found that exposure to heat may change the color of the pigment-protein complex.

While not wishing to be bound by theory, it is believed that the degradation in the color of the pigment-protein complex is due to a change in the confirmation of the protein upon exposure to heat.

More specifically, one type of pigment-protein complex in the phycocyanin spirulina. Spirulina is a cyanobacterium (blue-green algae) that can be consumed by humans and other animals. Spirulina has a natural blue-green color and, as such, may be used as a natural colorant for food products. However, it has been found that the color of spirulina, and hence the color of the food products in which it is incorporated, changes when spirulina is exposed to elevated temperatures. For example, it has been found that when gelatin compositions containing spirulina are exposed to boiling water, the color hue of the food product changes. While not wishing to be bound by theory, it is believed that this change in color may be due to a change or degradation of the protein in spirulina upon exposure to elevated temperatures, as noted hereinabove.

More specifically, spirulina is partially proteinaceous. It is believed that elevated temperature exposure changes the physical conformation of the protein resulting in different light refraction properties. The resultant color after elevated temperature exposure may not be pleasing or desirable to a consumer.

The embodiments described herein provide a pigment-protein complex delivery system, specifically a pelletized colorant comprising a pigment-protein complex, which mitigates the color change of the pigment-protein complex upon elevated temperature exposure. It has been unexpectedly found that the encapsulation of the pigment-protein complex in an encapsulating agent comprising, for example, simple sugars, may protect the pigment-protein complex during elevated temperature exposure and mitigate color change. Without wishing to be bound by theory, it is believed that the compounding both slows the dissolution rate of the pigment-protein complex and its ultimate exposure to elevated temperatures thereby avoiding degradation of the color imparted to the product by the pigment-protein complex.

In various embodiments, a pigment-protein complex delivery system comprises a pelletized colorant which includes at least a pigment-protein complex and an encapsulating agent. In some embodiments, the pelletized colorant may optionally include a dry diluent. These constituents components of the pelletized colorant and methods for forming the pelletized colorant will now be described.

The pigment-protein complex is generally provided in a powdered form. In embodiments, the pigment-protein complex may be, for example and without limitation, a phycocyanin. Suitable phycocyanins include, without limitation, spirulina. When spirulina is selected as the pigment-protein complex, the spirulina in the pelletized colorant provides a blue or blue-green color to the food product in which the pelletized colorant is incorporated such as, for example, a gelatin food product. Suitable spirulina powders are commercially available from Sensient Food Colors LLC of St. Louis, Mo. In the embodiments described herein the pigment-protein complex powder may be present in the pelletized colorant in an amount from about 0.1 wt % to about 40 wt %. For example, in embodiments the pigment protein complex powder may be present in the pelletized colorant in an amount from about 0.2 wt % to about 30 wt %. In some other embodiments, the pigment protein complex powder may be present in the pelletized colorant in an amount from about 0.3 wt % to about 20 wt %. In some embodiments, the pigment protein complex powder may be present in the pelletized colorant in an amount from about 0.5 wt % to about 15 wt %. In still other embodiments, the pigment protein complex powder may be present in the pelletized colorant in an amount from about 1 wt % to about 10 wt % based on the weight of the pelletized colorant. In some embodiments, the pigment-protein complex may be present in an amount from about 2 wt % to about 7 wt % based on the weight of the pelletized colorant. In some other embodiments, the pigment-protein complex may be present in the pelletized colorant in an amount from about 3 wt % to about 5 wt % based on the weight of the pelletized colorant.

In the embodiments described herein, the encapsulating agent comprises one or more water soluble components in which the pigment-protein complex may be encapsulated. The encapsulating agent coats the pigment-protein complex particulates and also functions as a binder to bind the pigment-protein complex particulates together. Encapsulating the pigment-protein complex particulates in the encapsulating agent provides a mechanism to control the release of the pigment-protein complex particulates in a solvent at elevated temperatures, such as water, in which the pelletized colorant is placed. While not wishing to be bound by theory, it is hypothesized that, by coating the pigment-protein complex particulates, the encapsulating agent insulates the pigment-protein complex particulates from elevated temperatures which may otherwise degrade or alter the color imparted by the pigment-protein complex particulates. That is, when the pelletized colorant is added to a solvent at elevated temperatures, the encapsulating agent insulates the pigment-protein complex particulates, allowing the solvent to cool as the encapsulating agents dissolves and releases the pigment-protein complex into the solvent at a lower temperature which does not alter or degrade the color imparted by the pigment-protein complex.

In embodiments of the pelletized colorant described herein, suitable encapsulating agent may include, without limitation, simple sugars in liquid form. For example, in some embodiments, the encapsulating agent may be corn syrup, honey, mizaume, molasses, maple syrup, agave, fructo oligo accharides, brown rice syrup, liquid sugar, invert syrups, Glycerin, propylene glycol, poly ethylene glycol, 1,3 propane diol and/or combinations thereof. In some other embodiments, the encapsulating agent may include, without limitation, oils, hydrocolloids such as gums, gelling proteins, alginates, and water. Suitable oils include, for example and without limitation, vegetable oil and soy bean oil. Suitable hydrocolloids include, for example and without limitation, xanthan gum, gum arabic, guar, locust bean gum, carrageenan, konjac gum, gellan, cereal flours such as those from corn, wheat rice, millet rye, sorghum, and rice and carageenan. Suitable gelling proteins include whey, egg albumins, pea protein, gelatin, wheat gluten. Suitable alginates include, for example and without limitation, sodium alginates. While any of the foregoing are suitable for use as the encapsulating agent, it should be understood that other types of syrups and/or binders suitable for use in food preparation are contemplated and possible for the encapsulating agent. In one particular embodiment, the encapsulating agent is corn syrup.

The encapsulating agent may be present in the pelletized colorant in an amount of from about 60 wt % to about 99.9 wt % based on the weight of the pelletized colorant. 70 wt % to about 95 wt % based on the weight of the pelletized colorant. In some embodiments, the encapsulating agent may be present in an amount of from about 75 wt % to about 90 wt %, from about 80 wt % to about 90 wt %, or even from about 85 wt % to about 90 wt % based on the weight of the pelletized colorant. Although the amount of encapsulating agent may vary depending on the particular embodiment, it should be understood that the encapsulating agent should be present in an amount suitable to protect the pigment-protein complex when exposed to heat, such as when the pelletized colorant is exposed to hot water. The encapsulating agent may also be selected, at least in part, based on a targeted rate of dissolution for the pelletized colorant.

In some embodiments, the pelletized colorant may optionally include at least one filler or dry diluent. The dry diluent may be used to promote uniform dispersal of the pigment-protein complex particulates in the solvent in which the pelletized colorant is dissolved. More specifically, it has been found that the pigment-protein complex particulates tend to agglomerate or "clump" when released in to a solvent such as, for example, water. The agglomeration of the pigment-protein complex particulates can affect the dissolution of the pigment-protein complex particulates in the solvent which, in turn, can alter the color imparted by the pigment-protein complex particulates. In embodiments, a dry diluent may be added to mitigate agglomeration of the pigment-protein complex particulates as pelletized colorant dissolves in solution.

The dry diluent may be selected, for example, based on a taste or mouth feel desired in the final product in which the pelletized colorant is incorporated. In addition, the dry diluent may be selected, at least in part, based on the targeted rate of dissolution for the pelletized colorant. That is, the dry diluent may be selected such that, when combined with the pigment-protein complex particulates and the encapsulating agent in the pelletized colorant, the pelletized colorant has a desired rate of dissolution in a specific solvent.

In embodiments, the dry diluent may be, for example, sucrose, maltodextrin, other types of granular sugars (including stevia and the like), cyclodextrin, grain flours, starches (such as modified food starch including corn starch), fiber, protein, fats, cystalline acids (e.g., citric, malic, fumaric, adipic), mineral salts, buffering agents (e.g., calcium chloride, calcium sulfate, calcium carbonate, and/or titanium dioxide), flow agents, (e.g., silicates), gelatin (such as Type I gelatin), and/or various combinations thereof. While specific examples of suitable dry diluents have been provided, it should be understood that other types of dry diluents are contemplated and possible including, without limitation, bulking agents commonly used in the food industry for increasing the bulk of a product without affecting its flavor profile. In one particular embodiment, the dry diluent is sucrose.

The dry diluent, when included, may be present in the pelletized colorant in an amount from about 0 wt % to about 85 wt %, from about 5 wt % to about 80 wt %, or even from about 10 wt % to about 75 wt % based on the weight of the pelletized colorant.

In the embodiments described herein, the constituent components of the pelletized colorant have particle sizes within a range from about 2 micrometers (μm) to about 0.5 millimeters (mm). For example, in embodiments, the pigment-protein complex particulates may have an average particle size of about 5.33 μm. In embodiments where the dry diluent is, for example, sucrose, specifically granulated sugar, the sucrose may have a particle size from about 0.25 mm to about 0.5 mm.

In various embodiments, the pelletized colorant is formed by dry blending the pigment-protein complex and the dry diluent (if included). The encapsulating agent is then added to the dry blend and further mixed to form a homogenous blend.

In various embodiments, once the mixture of the pigment-protein complex particulates, optional dry diluent(s), and the encapsulating agent is blended, the mixture is pelletized. The mixture may be pelletized according to any suitable method. For example, in some embodiments, the mixture is placed in a mold and compression molded to form pellets of a particular size and shape. In some other embodiments, the mixture may be extruded and the extrudate segmented into individual pellets. In some embodiments, after pelletization, the pelletized colorants may be dried at ambient conditions or, alternatively, under sufficiently low heat so as not to degrade the pigment-protein complex particulates in the pelletized colorants.

In embodiments, the pelletized colorants may be generally spherical in shape and have a diameter of approximately 0.5 centimeters (cm). In some other embodiments, the diameter of the pelletized colorants may be 0.25 cm. In still other embodiments, the pelletized colorants, once formed, may be fractured into sub-pellets, each sub-pellet having the same composition of the pelletized colorant from which it was formed (i.e., the same composition of pigment-protein complex particulates, encapsulating agent, and dry diluent, when included). While specific shapes and sizes of the pelletized colorants are described herein for purposes of illustration and example, it should be understood that other shapes and sizes for the pelletized colorants are contemplated and possible and that the specific size and shape of the pelletized colorants may be selected to achieve a desired dissolution rate in a particular solvent.

As noted hereinabove, the pelletized colorant may be incorporated in a food product to impart a blue or blue-green color to the food product. For example, in one embodiment, the pelletized colorant is incorporated into a powdered gelatin composition. In this embodiment, the powdered gelatin composition comprises a dry powdered composition that includes the pelletized colorant and powdered gelatin. The pelletized colorant may be present in an amount from about 0.1 wt % to about 10 wt % based on the weight of the dry powdered composition. In some embodiments, the pelletized colorant may be present in an amount of from about 0.5 wt % to about 7.5 wt % or even from about 1 wt % to about 5 wt % based on the weight of the dry powdered composition.

In various embodiments, the powdered gelatin may be present in the dry powdered composition in an amount from about 1 wt % to about 20 wt % based on the weight of the dry powdered composition. In some embodiments, the powdered gelatin may be present in the dry powdered composition in an amount from about 2.5 wt % to about 15 wt % or even from about 5 wt % to about 10 wt % based on the weight of the dry powdered composition.

The dry powdered composition may include other constituent components including, without limitation, pH regulators, flavor components, and other additives. The dry powdered composition may also include one or more natural and/or artificial sweeteners. In embodiments where the dry powdered composition includes a natural sweetener, the sweetener may comprise, for example and without limitation, sucrose, glucose, other sugars such as dextrose, stevia, or combinations thereof. In these embodiments, the sweetener may be present in an amount from 50 wt % to about 95 wt %, from about 75 wt % to about 93 wt %, for even from about 80 wt % to about 90 wt % by weight based on the weight of the dry powdered composition.

In some other embodiments, the dry powdered composition may include one or more artificial sweeteners. In these embodiments, the artificial sweetener may include, for example and without limitation, acesulfame potassium, aspartame or another artificial sweetener or combination thereof. In these embodiments, the artificial sweetener may be present in an amount from greater than 0 wt % to about 5 wt %, from about 1 wt % to about 4 wt %, for even from about 1.5 wt % to about 3 wt % by weight based on the weight of the dry powdered composition.

The gelatin's consistency is influenced by the pH of the formulation. Accordingly, in various embodiments, pH regulators are incorporated into the dry powdered composition to provide the proper pH. More specifically, pH regulators may be incorporated in the dry powdered composition to achieve a desired final texture, gel strength, and speed of setting of the gelatin composition. The desired pH may vary depending on the particular embodiment. In various embodiments, suitable pH regulators may include, by way of example and not limitation, acids and buffer salts, including but not limited to, citric, malic, ascorbic and erythorbic acids and food grade inorganic acids, such as phosphoric acid, hydrochloric acid and sulfuric acid. The use of salts of these acids is also contemplated. For example, in one particular embodiment, sodium citrate and disodium phosphate are employed as pH regulators in the dry powdered composition. In various embodiments, the dry powdered composition includes pH regulators in an amount from about 0.001 wt % to about 10 wt % based on the weight of the dry powdered composition. Other embodiments may include from about 0.1 wt % to about 5 wt % or from about 0.5 wt % to about 2 wt % of pH regulators based on the weight of the dry powdered composition.

In some embodiments, the dry powdered composition further includes one or more flavor components. Flavor components may include, by way of example and not limitation, artificial flavors, natural flavors or combinations thereof. For example and without limitation, typical flavors include blueberry, cherry, raspberry, strawberry, lime, orange, lemon, and the like. The flavor component may be present in an amount from about 0.1 wt % to about 15 wt % based on the weight of the dry powdered composition, depending on the particular embodiment. In some embodiments, the flavor component may be present in an amount from 0.5 wt % to about 10 wt % or from about 1 wt % to about 5 wt % based on the weight of the dry powdered composition.

Additionally, in some embodiments, one or more food grade acids may be employed to enhance the flavor of the gelatin. The acids may include, by way of example and not limitation, adipic acid, fumaric acid, citric acid, tartaric acid, ascorbic acid, isoascorbic acid, and combinations thereof. In addition to enhancing the flavor, in some embodiments, the food grade acid may further alter the pH of the gelatin composition. Accordingly, the amount of food grade acid may depend on the amount of gelatin, the amount of pH regulator, and the desired flavor of the gelatin. In various embodiments, the food grade acid is present in an amount from about 0.01 wt % to about 10 wt % based on the weight of the dry powdered composition. In some embodiments, the food grade acid may be present in an amount from about 0.1 wt % to about 8 wt % or from about 0.5 wt % to about 6 wt % based on the weight of the dry powdered composition. In one particular embodiment, the dry powdered composition includes from about 0 wt % to about 1 wt % fumaric acid and from about 1 wt % to about 5 wt % adipic acid based on the weight of the dry powdered composition.

In some embodiments, the dry powdered composition may further include one or more additional colorants. For example, additional colorants may be added to achieve a particular shade of blue, green, or violet. In various embodiments, the additional colorants are naturally-derived colorants. Accordingly, it should be understood that, in some embodiments, the dry powdered composition of various embodiments is substantially free of synthetic colorants.

In various embodiments, the components of the dry powdered composition can be mixed by dry blending. In embodiments in which the components are dry blended together, each of the components, including the powdered gelatin, the pelletized colorant, and any additional components, such as sweeteners, pH regulators, and/or flavor components, can be provided in dry powder form and blended to uniformly distribute the components in the composition. The dry powdered composition may then be packaged for sale to consumers or may be reconstituted to provide a gelatin product that is sold in ready-to-eat form to consumers.

The dry powdered composition may be reconstituted to provide a gelatin product, such as those commercially available under the trademark JELL-O® (The Kraft-Heinz Company, Northfield, Ill.). In various embodiments, the gelatin product is reconstituted by dissolving the dry powdered composition in a hot solvent, such as water or juice, while mixing. The hot solvent may have a temperature from about 54° C. to about 105° C. In particular embodiments, the dry powdered composition is dissolved in boiling water (e.g., water at a temperature of from about 95° C. to about 100° C.). The solution is then cooled to set the gelatin. For example, in some embodiments, to facilitate cooling, cold solvent (such as cold water) may be added to the solution, while in other embodiments, the solution is refrigerated.

In various embodiments, the solution includes from about 0.001 wt % to about 3 wt % of the pelletized colorant, from about 0.01 wt % to about 2 wt % of the pelletized colorant, or from about 0.1 wt % to about 1 wt % of the pelletized colorant based on the final solution on a wet basis. The solution may further include from about 0.1 wt % to about 10 wt % gelatin, from about 0.5 wt % to about 7.5 wt % gelatin, or from about 1 wt % to about 5 wt % gelatin based on the final solution on a wet basis. In various embodiments, the solution also includes from about 5 wt % to about 20 wt % sweetener, from about 7 wt % to about 17 wt % sweetener, or from about 10 wt % to about 15 wt % sweetener based on the final solution on a wet basis. One or more pH regulators may be present in the solution in an amount of from about 0.001 wt % to about 2 wt %, from about 0.01 wt % to about 1.5 wt %, or from about 0.1 wt % to about 1 wt % of the pelletized colorant based on the final solution on a wet basis. Various embodiments of the solution may also include from about 0.001 wt % to about 1.5 wt % flavor component, from about 0.01 wt % to about 1.0 wt % flavor component, or from about 0.1 wt % to about 0.5 wt % flavor component based on the final solution on a wet basis. Flavor enhancers may be included in the solution in an amount of from about 0.001 wt % to about 3 wt %, from about 0.005 wt % to about 2 wt %, or from about 0.01 wt % to about 1.5 wt % based on the final solution on a wet basis. The solution may be from about 75 to about 95 wt % or from about 80 wt % to about 90 wt % solvent based on the final solution on a wet basis.

As noted hereinabove, it is believed that the incorporation of the pigment-protein complex particulates in the pelletized colorant with the encapsulating agent insulates and protects the pigment-protein complex particulates and thereby prevents the pigment-protein complex particulates from being denatured and degraded during exposure to the solvent at elevated temperatures, thereby preventing the degradation of the color imparted to the solvent by the pigment-protein complex particulates. In particular, it is believed that the pigment-protein complex particulates are denatured at temperatures in excess of 78° C. and, as such, the encapsulating agents are used to insulate and protect the pigment-protein complex particulates until the solvent cools to 80° C. or below. It is believed that encapsulating the pigment-protein complex particulates slows the release of the pigment-protein complex particulates into the solvent, allowing for the solvent to cool to temperatures above which the pigment-protein complex particulates are denatured.

In various embodiments, the pelletized colorant has a dissolution rate of less than or equal to 2 grams/minute (g/min) in water at a temperature of from about 95° C. to about 100° C. resting at standard temperature and pressure. In various embodiments, the pelletized colorant has a dissolution rate of less than or equal to 1 gram/minute (g/min) in water at a temperature of from about 95° C. to about 100° C. resting at standard temperature and pressure. That is, the dissolution rate of the pelletized colorant is measured by heating water to a temperature of 100° C., removing the heat source from the water, adding the pelletized colorant to the water while the water is at a temperature of from about 95° C. to about 100° C., and allowing the water to cool at standard temperature and pressure while stirring. In embodiments, the dissolution rate may be less than or equal to 0.9 g/min or even less than or equal to 0.8 g/min. The dissolution rate is generally greater than about 0.6 g/min or even greater than about 0.7 g/m. It is believed that these dissolution rates of the pelletized colorant are sufficient to protect the pigment-protein complex particulates from being denatured from the time the dry powdered composition is added to the solvent (e.g., the boiling water) until a time at which the temperature of the solution drops below a temperature at which the pigment-protein complex particulates may be denatured, thereby minimizing the degradation of the color imparted to the solvent by the pelletized colorant.

More particularly, the protection of the pigment-protein complex particulates from the denaturing temperatures may result in improved color and clarity of the gelatin product. For example, gelatin product made from various embodiments of the dry powdered composition which include spirulina particulates as the only colorant may have average L* values from about 49 to about 57, a* values from about −10 to about −16, and b* values from about −11 to about −20.5 when measured according to the CIE L*a*b* color system.

EXAMPLES

It is believed that the various embodiments described hereinabove will be further clarified by the following examples.

Example 1

To determine the degradation temperature threshold of pigment-protein complex particulates, such as spirulina particulates, five batches of powdered gelatin were prepared. The powdered gelatin included gelatin, sucrose as a sweetener, disodium phosphate and sodium citrate as pH regulators, adipic acid and fumaric acid as flavor enhancers, and a flavor component. The powdered gelatin also included 0.25 wt. % of spirulina particulates in powdered form.

Each batch of powdered gelatin was mixed with water at a different temperature, specifically 74° C., 82° C., 86.5° C., 85° C., and 83° C. and the color of the resultant gelatin was observed. The results are presented in Table 1.

TABLE 1

| Water Temperature (° C.) | Observed Color Hue |
|---|---|
| 74 | Blue |
| 82 | Blue |
| 86.5 | Turquoise |
| 85 | Turquoise |
| 83 | Turquoise |

As shown in Table 1, the color hue of the gelatin transitioned from blue to turquoise at a temperature between 82° C. and 83° C. This color transition is indicative of the denaturing of the spirulina particulates. Based on this observation, it was determined that the degradation temperature threshold of the spirulina particulates was greater than 80° C. and, more specifically, greater than 82° C.

Example 2

Two dry powdered gelatin compositions were formed (Compositions 1 and 2). Each of the compositions included gelatin, sucrose as a sweetener, disodium phosphate and sodium citrate as pH regulators, adipic acid and fumaric acid as flavor enhancers, and a flavor component. Composition 1 also included 0.25 wt % of spirulina particulates in powdered form. Composition 2 included 0.15 wt % of spirulina particulates in powdered form.

The components for each of the mixtures were blended together to form the dry powdered compositions. For each composition, 85 grams of the dry powdered composition was dissolved in 1 cup of boiling water. Thereafter, an additional 1 cup of cold water was added. The mixture was then refrigerated for 4 hours to yield the gelatin of Comparative Examples 1 and 2 to assess the degradation in color due to exposure of the spirulina particulates to elevated temperatures. After setting, the CIE L*a*b* color coordinates of samples of the gelatin of Comparative Examples 1 and 2 were measured in a Hunter Colorimeter (model Lab Scan XE).

For purposes of comparison, encapsulation of the spirulina particulates was simulated for each dry powdered composition by dissolving the dry powdered composition in 70° C. water and allowing the gelatin to set to yield the gelatin of Examples 1 and 2. After setting, the CIE L*a*b* color coordinates of samples of the gelatin of Examples 1 and 2 were measured in a Hunter Colorimeter (model Lab Scan XE). L*, a*, and b* values are reported in Table 2 for Examples 1 and 2 and Comparative Examples 1 and 2.

TABLE 2

| | Average LAB Values | | | |
|---|---|---|---|---|
| Composition | Example 1 Composition 1 | Example 2 Composition 2 | Comparative Example 1 Composition 1 | Comparative Example 2 Composition 2 |
| L* | 49.405 | 57.365 | 54.205 | 59.43 |
| a* | −16.125 | −10.28 | −12.605 | −7.595 |
| b* | −20.05 | −11.545 | −10.97 | −7.125 |

Visually, the gelatin product made while simulating encapsulation (Examples 1 and 2) exhibited a desirable blue hue. However, gelatin product made from the same dry powdered compositions but prepared using boiling water (Comparative Examples 1 and 2) exhibited a green-blue hue and had a slightly metallic gray appearance. In particular, the gelatin product prepared to simulate encapsulation of the spirulina (Examples 1 and 2) exhibited an appearance similar to conventional gelatin products made from a dry powdered gelatin composition that includes artificial colorants. Specifically, the gelatin product of Examples 1 and 2 had average L* values from about 49 to about 57, a* values from about −10 to about −16, and b* values from about −11 to about −20.5, while the gelatin product of the comparative examples exhibit average b* values of greater than −11.

Without being bound by theory, this data suggests that encapsulation of spirulina by pelletizing the spirulina with an encapsulating agent will result in a color and appearance similar to conventional gelatin products that include synthetic colorants.

Example 3

To assess the effect of encapsulating spirulina particulates in an encapsulating agent, pelletized colorants were formed from two different compositions. The specific compositions are listed below in Tables 3 and 4 and included spirulina, corn syrup as the encapsulating agent, and refined sugar (sucrose) as the dry diluent. It is noted that the corn syrup in Table 4 (43 DE) had a faster dissolution rate than the corn syrup in Table 3.

TABLE 3

Pelletized Colorant Composition Formula 1

| Component | Weight (grams) |
|---|---|
| Spirulina | 0.5 |
| Corn Syrup | 2.5 |
| Refined Sugar (Sucrose) | 10 |

TABLE 4

Pelletized Colorant Composition Formula 2

| Component | Weight (grams) |
|---|---|
| Spirulina | 0.5 |
| Corn Syrup- 43 DE | 5 |
| Refined Sugar (Sucrose) | 10 |

The formulas 1 and 2 were formed into pelletized colorants by blending the spirulina, corn syrup, and sugar into a homogenous paste. The paste was then formed into a pellet (i.e., a pelletized colorant) by rolling the paste into a substantially spherical shape. Each pellet had a weight of approximately 2 grams.

Each pellet was combined in a separate powdered gelatin composition. The powdered gelatin composition had the same basic formula as the powdered gelatin composition of Example 1 although without the loose powdered spirulina. The powdered gelatin compositions were mixed with one cup of boiling water (100° C.) and stirred for two minutes until the powdered gelatin composition was dissolved.

It was observed that the resulting gelatin product had a blue hue rather than a turquoise hue indicating that encapsulating and pelletizing the spirulina particulates protected the spirulina from the heat of the 100° C. boiling water until the water cooled to below about 80° C. It was noted that the pelletized colorant formed from formula 1 (Table 3) had a slower dissolution rate than the pelletized colorant formed from formula 2 (Table 4).

To assess the effect of pellet size on color characteristics, four smaller pellets were formed from formula 2 (Table 4). Each pellet had a weight of approximately 0.5 grams. The four pellets were combined in a single powdered gelatin composition which was then mixed with one cup of boiling water (100° C.) and stirred for two minutes until the powdered gelatin composition was dissolved.

It was observed that the smaller pellets appeared to dissolve faster than a single large pellet and, as a result of this faster dissolution rate, the spirulina particulates were not protected from the heat of the 100° C. boiling water resulting in the gelatin product having a turquoise hue rather than a blue hue.

It should now be understood that embodiments of the present disclosure enable a food product, such as gelatin or the like, to be colored using pigment-protein complexes such as spirulina while retaining the desired color and overall appearance similar to conventional food products including synthetic colorants. Moreover, various embodiments enable the pigment-protein complexes to be incorporated into a dry powdered composition in a pelletized form such that the pigment-protein complexes are heat-stable. In embodiments, the dry powdered composition can be reconstituted to form a gelatin product when combined with water, for example. Other advantages will be appreciated by one skilled in the art.

Embodiments can be described with reference to the following numbered clauses, with preferred features laid out in the dependent clauses:

1. A colorant for a food product comprising: from about 0.1 wt % to about 40 wt % of a pigment-protein complex; and from about 60 wt % to about 99.9 wt % encapsulating agent, the encapsulating agent encapsulating the pigment-protein complex in a pelletized colorant, the pelletized colorant having a rate of dissolution of less than 2 grams/ minute in water having an initial temperature of from about 95° C. to about 100° C.

2. The colorant of clause 1, wherein the encapsulating agent is at least one of corn syrup, honey, mizaume, molasses, maple syrup, agave, fructo oligo accharides, brown rice syrup, liquid sugar, invert syrups, glycerin, propylene glycol, poly ethylene glycol, 1,3 propane diol.

3. The colorant of clause 1 or clause 2, wherein the encapsulating agent is at least one of an oil, hydrocolloid gelling protein, and alginate.

4. The colorant of any preceding clause, further comprising up to about 85 wt % dry diluent.

5. The colorant of clause 4, wherein the dry diluent is at least one of sucrose, maltodextrin, a granular sugar, cyclodextrin, a grain flour, a starch, fiber, a protein, fat, a crystalline acid, a mineral salt, a buffering agent, a flow agent, and gelatin.

6. A dry powdered composition which may be reconstituted to provide a gelatin product, the dry powdered composition comprising: powdered gelatin; and a pelletized colorant comprising: a pigment-protein complex; and at least one encapsulating agent encapsulating the pigment-protein complex; wherein the pelletized colorant has a rate of dissolution of less than 1 gram/minute in water having an initial temperature of from about 95° C. to about 100° C.

7. The dry powdered composition of clause 6, wherein the dry powdered composition is substantially free of synthetic colorants.

8. The dry powdered composition of clause 6 or clause 7, wherein the pelletized colorant comprises: from about 0.1 wt % to about 40 wt % pigment-protein complex based on a weight of the pelletized colorant; and from about 60 wt % to about 99.9 wt % encapsulating agent based on the weight of the pelletized colorant.

9. The dry powdered composition of any one of clauses 6-8, wherein the pelletized colorant further comprises a dry diluent.

10. The dry powdered composition of clause 9, wherein the dry diluent comprises sucrose, maltodextrin, a granular sugar, cyclodextrin, a grain flour, a starch, fiber, a protein, fat, a crystalline acid, a mineral salt, a buffering agent, a flow agent, gelatin, or combinations thereof.

11. The dry powdered composition of either clause 9 or clause 10, wherein the pelletized colorant comprises: from about 0.1 wt % to about 40 wt % pigment-protein complex based on a weight of the pelletized colorant; from about 60 wt % to about 99.9 wt % encapsulating agent based on the weight of the pelletized colorant; and from about 0 wt % to about 85 wt % dry diluent based on the weight of the pelletized colorant.

12. The dry powdered composition of any one of clauses 6-11, further comprising at least one sweetener.

13. The dry powdered composition of any one of clauses 6-12, further comprising at least one pH regulator.

14. The dry powdered composition of any one of clauses 6-13, further comprising at least one flavor component.

15. A gelatin made from a powdered gelatin composition, the powdered gelatin composition comprising: powdered gelatin; and a pelletized colorant comprising: a pigment-protein complex; and at least one encapsulating agent encapsulating the pigment-protein complex; wherein the gelatin has a L* value from about 49 to about 57, an a* value from about −10 to about −16, and a b* value from about −11 to about −20.5.

16. The gelatin according to clause 15, wherein the gelatin is substantially free of synthetic colorants.

17. The gelatin according to either clause 15 or clause 16, wherein the powdered gelatin composition further comprises at least one sweetener, at least one pH regulator, or at least one flavor component.

18. The gelatin according to any one of clauses 15-17, wherein the pelletized colorant has a rate of dissolution of less than 2 grams/minute in water having an initial temperature of from about 95° C. to about 100° C.

19. A method of making a powdered gelatin composition comprising: mixing powdered gelatin with a pelletized colorant comprising: from about 0.1 wt % to about 40 wt % pigment-protein complex based on a weight of the pelletized colorant; and from about 60 wt % to about 99.9 wt % encapsulating agent based on the weight of the pelletized colorant, wherein the pelletized colorant has a rate of dissolution of less than 2 grams/minute in water having an initial temperature of from about 95° C. to about 100° C.

20. The method of clause 19, wherein mixing powdered gelatin with the pelletized colorant comprises: blending a pigment-protein complex with the encapsulating agent to form a pigment-protein complex blend; and forming a pellet from the pigment-protein complex blend.

21. The method of either clause 19 or clause 20, wherein the pelletized colorant further comprises from about 0 wt % to about 85 wt % dry diluent based on the weight of the pelletized colorant.

22. The method of clause 21, wherein the dry diluent comprises sucrose, maltodextrin, a granular sugar, cyclodextrin, a grain flour, a starch, fiber, a protein, fat, a crystalline acid, a mineral salt, a buffering agent, a flow agent, gelatin, or combinations thereof.

23. The method of any one of clauses 19-22, wherein the powdered gelatin composition is substantially free of synthetic colorants.

24. The method of any one of clauses 19-23, wherein the encapsulating agent comprises corn syrup, honey, mizaume, molasses, maple syrup, agave, fructo oligo accharides, brown rice syrup, liquid sugar, invert syrups, glycerin, propylene glycol, poly ethylene glycol, 1,3 propane diol or combinations thereof.

25. The method of any one of clauses 19-24, wherein: the encapsulating agent comprises corn syrup; and the pelletized colorant further comprises a dry diluent wherein the dry diluent comprises sucrose.

26. A food product comprising: a pelletized colorant comprising: a pigment-protein complex; and at least one encapsulating agent encapsulating the pigment-protein complex; wherein the pelletized colorant has a rate of dissolution of less than 2 grams/minute in water having an initial temperature of from about 95° C. to about 100° C.

27. The food product of clause 26, wherein the food product is substantially free of synthetic colorants.

28. The food product of either clause 26 or clause 27, wherein the pelletized colorant comprises: from about 0.1 wt % to about 40 wt % pigment-protein complex based on a weight of the pelletized colorant; and from about 60 wt % to about 99.9 wt % encapsulating agent based on the weight of the pelletized colorant.

29. The food product of any one of clauses 26-28, wherein the pelletized colorant further comprises a dry diluent.

30. The food product of clause 29, wherein the dry diluent comprises sucrose, maltodextrin, starch, gelatin, a bulking agent, granulated sweetener, or combinations thereof.

31. The food product of either clause 29 or clause 30, wherein the pelletized colorant comprises: from about 0.1 wt % to about 40 wt % pigment-protein complex based on a weight of the pelletized colorant; from about 60 wt % to about 99.9 wt % encapsulating agent based on the weight of the pelletized colorant; and up to about 85 wt % dry diluent based on the weight of the pelletized colorant.

32. The food product of any one of clauses 26-31, further comprising at least one sweetener.

33. The food product of any one of clauses 26-32, further comprising at least one pH regulator.

34. The food product of any one of clauses 26-33, further comprising at least one flavor component.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

The invention claimed is:

1. A pelletized colorant for a food product comprising a homogeneous mixture of:
  from about 0.1 wt. % to about 40 wt. % of a pigment-protein complex; and
  from about 60 wt. % to about 99.9 wt. % water-soluble liquid binding agent, wherein the amounts of the pigment-protein complex and water-soluble liquid binding agent are based on the combined weight of the pigment-protein complex and water-soluble liquid binding agent,
the water-soluble liquid binding agent comprising one or more of simple sugar in liquid form, corn syrup, honey, mizuame, molasses, maple syrup, agave, fructo oligo saccharides, brown rice syrup, and invert syrup, the pelletized colorant having a rate of dissolution of less than 2 grams/minute in water having an initial temperature of from about 95° C. to about 100° C.

2. The pelletized colorant of claim 1, wherein the pigment-protein complex is in particulate form having particle sizes from about 2 micrometers to about 0.5 millimeters.

3. The pelletized colorant of claim 1, wherein the water-soluble liquid binding agent comprises corn syrup.

4. The pelletized colorant of claim 1, further comprising up to about 85 wt. % dry diluent by weight of the pelletized colorant.

5. The pelletized colorant of claim 4, wherein the dry diluent includes at least one of sucrose, maltodextrin, a granular sugar, cyclodextrin, a grain flour, a starch, fiber, and a protein.

6. The pelletized colorant of claim 1, wherein the dry diluent comprises sucrose.

7. The pelletized colorant of claim 1, wherein the pigment-protein complex comprises a phycocyanin.

8. The pelletized colorant of claim 1, wherein the pigment-protein complex comprises spirulina.

9. A powdered gelatin composition comprising gelatin and the pelletized colorant of claim 1.

10. The powdered gelatin composition of claim 9, wherein the gelatin is included in an amount from about 1 wt. % to about 20 wt % based on the weight of the powdered gelatin composition.

11. The powdered gelatin composition of claim 9, further comprising a food grade acid in an amount from about 0.01 wt. % to about 10 wt. % based on the weight of the powdered gelatin composition.

12. The powdered gelatin composition of claim 11, wherein the powdered gelatin composition includes from about 0 wt % to about wt, fumaric acid and from about 1 wt % to about 5 wt % adipic acid based on the weight of the powdered gelatin composition.

13. The powdered gelatin composition of claim 9, further comprising sodium citrate and disodium phosphate.

14. The powdered gelatin composition of claim 9, wherein the powdered gelatin composition is substantially free of synthetic colorants.

15. The powdered gelatin composition of claim 9, wherein the pigment-protein complex comprises spirulina.

16. A method of making a powdered gelatin composition comprising:
mixing powdered gelatin with a pelletized colorant, the pelletized colorant comprising a homogeneous mixture of:
from about 0.1 wt. % to about 40 wt. % pigment-protein complex; and
from about 60 wt. % to about 99.9 wt. % water-soluble liquid binding agent, wherein the amounts of the pigment-protein complex and water-soluble liquid binding agent are based on the combined weight of the pigment-protein complex and water-soluble liquid binding agent,
wherein the water-soluble liquid binding agent comprises one or more of simple sugar in liquid form, corn syrup, honey, mizuame, molasses, maple syrup, agave, fructo oligo saccharide, brown rice syrup, and invert syrup, wherein the pelletized colorant has a rate of dissolution of less than 2 grams/minute in water having an initial temperature of from about 95° C. to about 100° C.

17. The method of claim 16, the method further comprising forming the pelletized colorant by:
blending a pigment-protein complex with the water-soluble liquid binding agent to form a homogeneous pigment-protein complex blend; and
pelletizing the pigment-protein complex blend to form the pelletized colorant.

18. The method of claim 16, wherein the pelletized colorant further comprises dry diluent in an amount of up to about 85 wt. % based on the weight of the pelletized colorant.

19. The method of claim 16, wherein the dry diluent comprises one or more of sucrose, maltodextrin, a granular sugar, cyclodextrin, a grain flour, a starch, fiber, and protein.

20. The method of claim 16, wherein:
the water-soluble liquid binding agent comprises corn syrup; and
the pelletized colorant further comprises a dry diluent wherein the dry diluent comprises sucrose.

* * * * *

UNITED STATES PATENT AND TRADEMARK OFFICE
CERTIFICATE OF CORRECTION

PATENT NO. : 11,659,852 B2
APPLICATION NO. : 17/125628
DATED : May 30, 2023
INVENTOR(S) : McPherson et al.

It is certified that error appears in the above-identified patent and that said Letters Patent is hereby corrected as shown below:

On the Title Page

Item (57), under "Abstract", in Column 2, Lines 6-7, delete "a rate of dissolution a rate of dissolution" and insert -- a rate of dissolution --, therefor.

Signed and Sealed this
Twenty-first Day of May, 2024

Katherine Kelly Vidal
*Director of the United States Patent and Trademark Office*